(12) United States Patent
Solanki et al.

(10) Patent No.: US 6,919,895 B1
(45) Date of Patent: Jul. 19, 2005

(54) TEXTURE CACHING ARRANGEMENT FOR A COMPUTER GRAPHICS ACCELERATOR

(75) Inventors: Gopal Solanki, San Jose, CA (US); Kioumars Kevin Dawallu, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 473 days.

(21) Appl. No.: 09/273,827

(22) Filed: Mar. 22, 1999

(51) Int. Cl.[7] ............................................. G06F 15/16
(52) U.S. Cl. ...................... 345/503; 345/582; 345/552; 345/557
(58) Field of Search ................................ 345/501–503, 345/582, 587, 589, 606, 537, 552, 557, 558

(56) References Cited

U.S. PATENT DOCUMENTS

| | | | | |
|---|---|---|---|---|
| 5,831,640 A | * | 11/1998 | Wang et al. ................ 345/521 |
| 5,842,015 A | * | 11/1998 | Cunniff et al. .............. 709/104 |
| 5,987,567 A | * | 11/1999 | Rivard et al. ............... 711/118 |
| 6,011,565 A | * | 1/2000 | Kuo et al. ................... 345/513 |
| 6,067,090 A | * | 5/2000 | Sreenivas et al. ........... 345/431 |
| 6,085,292 A | * | 7/2000 | McCormack et al. ....... 711/140 |
| 6,173,378 B1 | * | 1/2001 | Rozario et al. ............. 711/163 |
| 6,204,863 B1 | * | 3/2001 | Wilde ......................... 345/515 |
| 6,252,608 B1 | * | 6/2001 | Snyder et al. .............. 345/473 |
| 6,253,262 B1 | * | 6/2001 | Rozario et al. ............... 710/39 |
| 6,259,460 B1 | * | 7/2001 | Gossett et al. .............. 345/552 |
| 6,278,645 B1 | * | 8/2001 | Buckelew et al. ..... 365/230.01 |
| 6,333,743 B1 | * | 12/2001 | Gossett et al. .............. 345/503 |

* cited by examiner

Primary Examiner—Ulka J. Chauhan
(74) Attorney, Agent, or Firm—Moser Patterson & Sheridan LLP (57) ABSTRACT

A method and apparatus which includes a graphics accelerator, circuitry responsive to pixel texture coordinates to select texels and generate therefrom a texture value for any pixel the color of which is to be modified by a texture, a cache to hold texels for use by the circuitry to generate texture value for any pixel, a stage for buffering the acquisition of texel data, and control circuitry for controlling the acquisition of texture data, storing the texture data in the cache, and furnishing the texture data for blending with pixel data.

3 Claims, 5 Drawing Sheets

TEXTURE CACHING ARRANGEMENT FOR A COMPUTER GRAPHICS ACCELERATOR

BACKGROUND OF THE INVENTION

1. Field of the Invention

This invention relates to computer systems, and more particularly, to methods and apparatus for caching data representing the texture of surfaces to be displayed by a computer.

2. History of the Prior Art

In three dimensional graphics, surfaces are typically rendered by assembling a plurality of polygons into a desired shape. The polygons are conventionally triangles having vertices which are defined in world space by three dimensional distance coordinates, by color values, and by texture coordinates. The color values define the brightness of each of red/green/blue (r, g, b) colors at each vertex and thus the color at each vertex. The texture coordinates (u, v) define the coordinates of each vertex on a texture map defined by values stored in memory. Other characteristics such as transparency, fog, spectral colors, and additional textures may also define each vertex in a particular system to provide more sophisticated rendering.

It has been the practice that an application program executing on a central processor provides to a graphics accelerator the coordinates and attributes of the vertices of each triangle which is to be included in the shape being assembled for display. The surfaces represented by an assembly of polygons are, as a generality, being viewed in perspective.

Typically, the application furnishes the horizontal (x) and vertical (y) distance coordinates as screen values. If instead the application furnishes the distance coordinates as world space values, then these values should, for proper display, be transformed into screen coordinates by a perspective transformation process. Along with the distance coordinates, the application typically furnishes the color values, the texture coordinates, and other attributes of the vertices as world space values. If the x and y screen coordinates of the vertices are known, the pixels defining a triangle on the screen may be determined. Then, the world space depth values (z), the color values, and the texture coordinates may be used to determine the depth value, the color values, and the texture coordinates for each pixel.

In order to provide perspective-correct values for each of the various attributes of a pixel to be displayed, the world space values of these attributes should be transformed into screen values. The vertices of a triangle define a plane in world space so the depth of positions in the triangle vary linearly from one vertex to the other within the triangle in world space. This allows the depth value for each position in the triangle in world space to be determined by a linear interpolation process. If the depth at any position in the triangle can be known, then the depth of each pixel which defines the triangle on the screen may be determined by perspective transformation of the world space depth values.

Similarly, the color values and the texture coordinates for each pixel defining the triangle vary linearly from vertex to vertex in world space; and the same type of linear interpolation process and perspective transformation could be used to find the color values and texture coordinates for each pixel in screen space.

Once the depth value, color values, and texture coordinates for each pixel have been determined, the texture coordinates could be utilized to determine texture values from the related texture map; and these texture values could then be utilized to modify the color values of each pixel in the triangle.

Although, all of this is conceivable, the prior art has not provided hardware to accomplish these processes because of the very large number of steps required and the time necessary to accomplish those steps. Instead, most of the attributes provided by an application program are simply treated as though they are screen coordinates. This provides colors and other attributes which may be somewhat distorted but useable. However, texture patterns are so distorted by such a compromise that they are unusable.

A texture map is a matrix of values which describe a pattern to be applied to the surface of the triangle to vary the colors in accordance with the pattern. Sets of texture coordinates u and v each indicate a particular texture value (texel) in a texture map and allow that texel to be accessed. The texture coordinates of the vertices of a triangular surface area thus define the position of the triangle on the texture map so that the texels within the triangle determine the texture applied to each portion of the surface of the triangle. Each individual screen pixel describing the triangle covers some portion of the texture map as the triangle is projected onto the screen.

Screen texture coordinates obtained by the linear interpolation and perspective projection processes are not typically integral values. On the other hand, indexing into a texture map is accomplished using integral coordinates. Consequently, non-integral coordinates obtained by interpolation and perspective projection must somehow be used to obtain texture values. A simple method of obtaining texture values uses the closest integral u and v values for each pixel to index into the texture map and then selects the texture value at that intersection. A more accurate method of determining a texture value called bilinear interpolation utilizes the integer portion of the u and v coordinates at the center of each pixel to determine four additional sets of integral coordinates defining positions on a texture map surrounding the pixel center. The process selects the texels at these four positions and then uses the fractional portion of the texture coordinates at the pixel center to weight the texture values surrounding the index point. The four weighted texture values are combined into a more accurate representation for modifying the color values of that pixel to reproduce the texture pattern.

Those skilled in the art have recognized that where a pixel covers a very large number of texture values on a texture map, only a small portion of those values will be represented in the final texture value selected to modify the color of that pixel using the methods described. Consequently, a more accurate method of texture mapping has been devised which provides texture maps at a plurality of different scales. A proper scale can be chosen so that the pixels defining the individual triangles may be made to cover numbers of texels in the projection of the texture map in screen space which accurately reproduce the texture value. The process of selecting a texture value for a pixel then includes an initial step for each particular triangle being rendered in which a texture map is selected having a scale adapted to accurately represent texture values for the pixels of that triangle. This selection may include an additional process of selecting scales above and below a desired scale and interpolating between those scales to reach a final scale.

Although these methods provide progressively more accurate texture values for pixels if the triangle lies in a plane parallel to the screen surface, they are all based on the assumption that the projection of a pixel onto the texture map is square or rectangular in shape. This assumption is incorrect in the greater number of cases when three dimensional shapes are being rendered. In fact, none of these methods is capable of describing with sufficient accuracy the texture values which should be attributed to the pixels when three dimensional shapes are rendered in any significant perspective on a flat screen surface.

Because of this, additional processes are being developed which include methods for determining texture values at a greater plurality of points within a pixel all of which points are positioned with regard to both the shape of the pixel and the shape of the texture map. In such methods, texture values are determined at each of these plurality of points (or at four points surrounding each point of this plurality of points) within a projected pixel and the values blended into a single final texture value.

As may be seen, the process of determining texture values for pixels is very complex and requires very large numbers of texels for many triangles. Whatever process is used to determine accurate texture values, it is first necessary to transfer this very large number of texture values from memory to the graphics accelerator circuitry so that these texture values may be utilized in the determination of a final texture value for each pixel in the triangle.

Conventionally, the data defining the texture values for each triangle are individually transferred by the central processing unit to the graphics accelerator via the system input/output bus. This requires that the central processing unit gain access to the system bus through the bus control circuitry, send the data for a first texture value, regain control of the bus to send data regarding a second texture value, and so on. Typically, it takes a great number of bus accesses to send the texture value data for each pixel in a single triangle. As will be appreciated, this is a relatively slow process. To date, the process has been acceptable because graphics accelerators have been too slow to handle the data provided by the central processing unit. However, at least one graphics accelerator has become fast enough to handle more data than the central processing unit is capable of transferring in this manner.

To cut down on bus transit time, many graphics accelerators now utilize very large amounts of local storage on the graphics accelerator and move as many texture maps as possible to that storage. These accelerators then utilize a processor on the graphics accelerator board to access this secondary memory and thereby reduce bus transit time. However, even though these accelerators often provide eight or sixteen megabytes of data storage some part of which may be used for caching textures, this secondary memory must still be accessed in the same manner that main memory is accessed to transfer the texture values to a texture engine where the texture values are manipulated to produce a final texture value for each pixel. Even this local memory access is significantly slower than desirable.

A recent graphics accelerator has overcome this problem by providing a texture cache for texels in addition to local storage for texture maps. The cache may be accessed much more rapidly than either local memory or system memory, and its use therefore significantly accelerates the operation of the graphics pipeline. For example, if cache access requires one interval of time, then access of a texture map in local memory may require thirty-two to sixty-four times that interval; and access of a texture map in local memory may require sixty-four to one hundred twenty-eight times that interval. In one embodiment, such a cache is usually capable of storing all of the texels to be used in defining a texture value for each pixel of a particular graphics primitive and to have those texels available for computation of a texture value as each pixel is rendered. Such a texture cache is described in detail in U.S. patent application Ser. No. 09/056,656, entitled Texture Cache For A Computer Graphics Accelerator, filed Apr. 7, 1998, and assigned to the assignee of the present invention.

One problem that has been encountered in utilizing such a texture cache is that there are times when the texel data is not available in the texture cache. For example, when a new texture is first applied to a triangle, the texels are not yet available in the cache. Similarly, since a cache must have a finite size, often all of the texture data needed for any triangle cannot be stored in the cache. Consequently, If the texture data is not in the cache, then the graphics pipeline must stall until the data is retrieved from local or system memory. The result is that significant delays in the graphics rendering pipeline occur.

It is desirable to provide apparatus and a method for more rapidly providing data defining texture values for use by graphics accelerator circuitry.

SUMMARY OF THE INVENTION

This and other desired results of the present invention are realized by a method and apparatus which includes a graphics accelerator, circuitry responsive to pixel texture coordinates to select texels and generate therefrom a texture value for any pixel the color of which is to be modified by a texture, a cache to hold texels for use by the circuitry to generate texture value for any pixel, a stage for buffering the acquisition of texel data, and control circuitry for controlling the acquisition of texture data, storing the texture data in the cache, and furnishing the texture data for blending with pixel data. The use of the buffer stage and control circuitry allows a significant reduction in the need to stall the graphics pipeline.

These and other objects and features of the invention will be better understood by reference to the detailed description which follows taken together with the drawings in which like elements are referred to by like designations throughout the several views.

DETAILED DESCRIPTION

Figure 1:
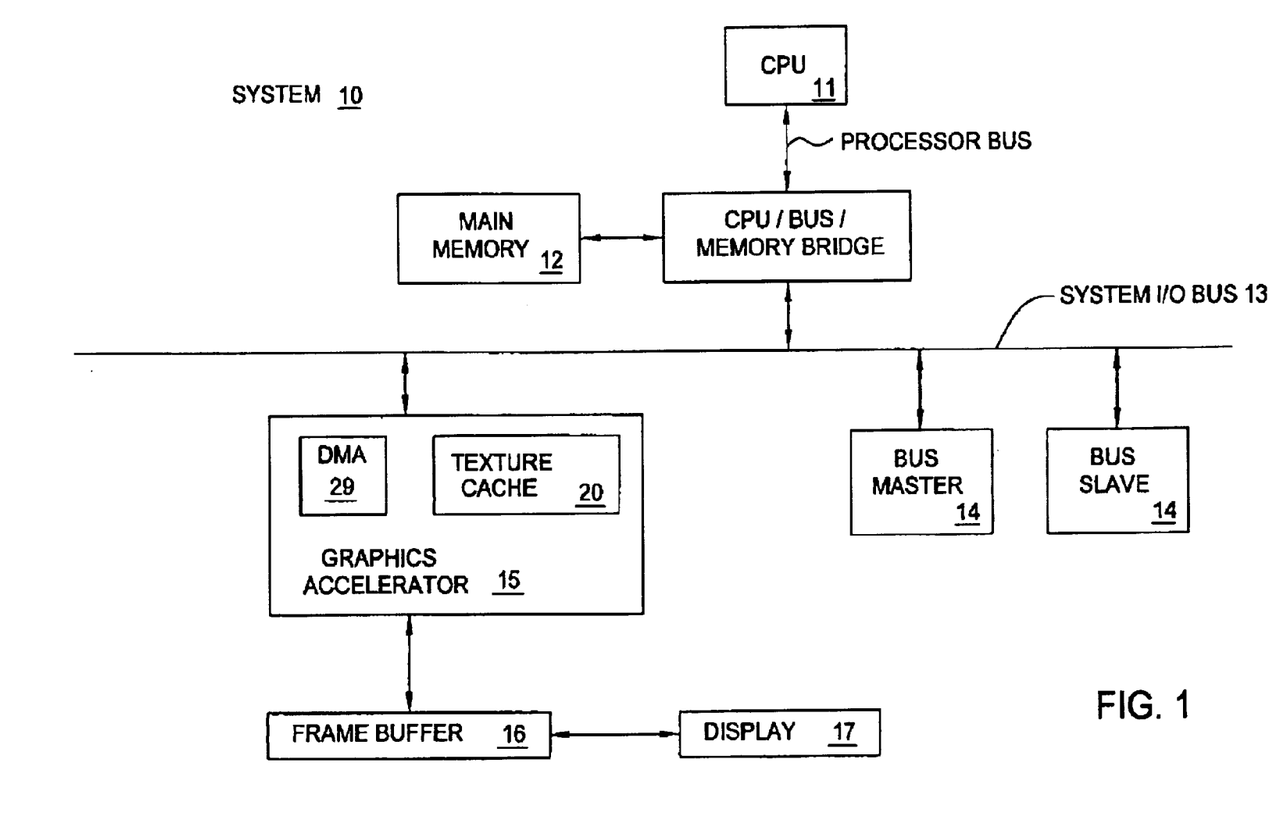
FIG. 1 is a block diagram describing a computer utilizing the present invention.

FIG. 1 is a block diagram illustrating a computer system 10 the elements of which cooperate to enable the present invention. The system 10 includes a central processing unit (CPU) 11, main memory 12, a system input/output (I/O) bus 13, and various I/O devices 14 and 15.

The I/O device 15 is a graphics accelerator circuit designed in accordance with the present invention to speed the transfer of graphics data from memory to a frame buffer 16 and ultimately to an output device such a computer display 17. Although not illustrated, the graphics accelerator circuit could be joined to a bus such as the AGP bus designed by Intel Corporation of Santa Clara, Calif., adapted to provide only graphics information.

Figure 2:
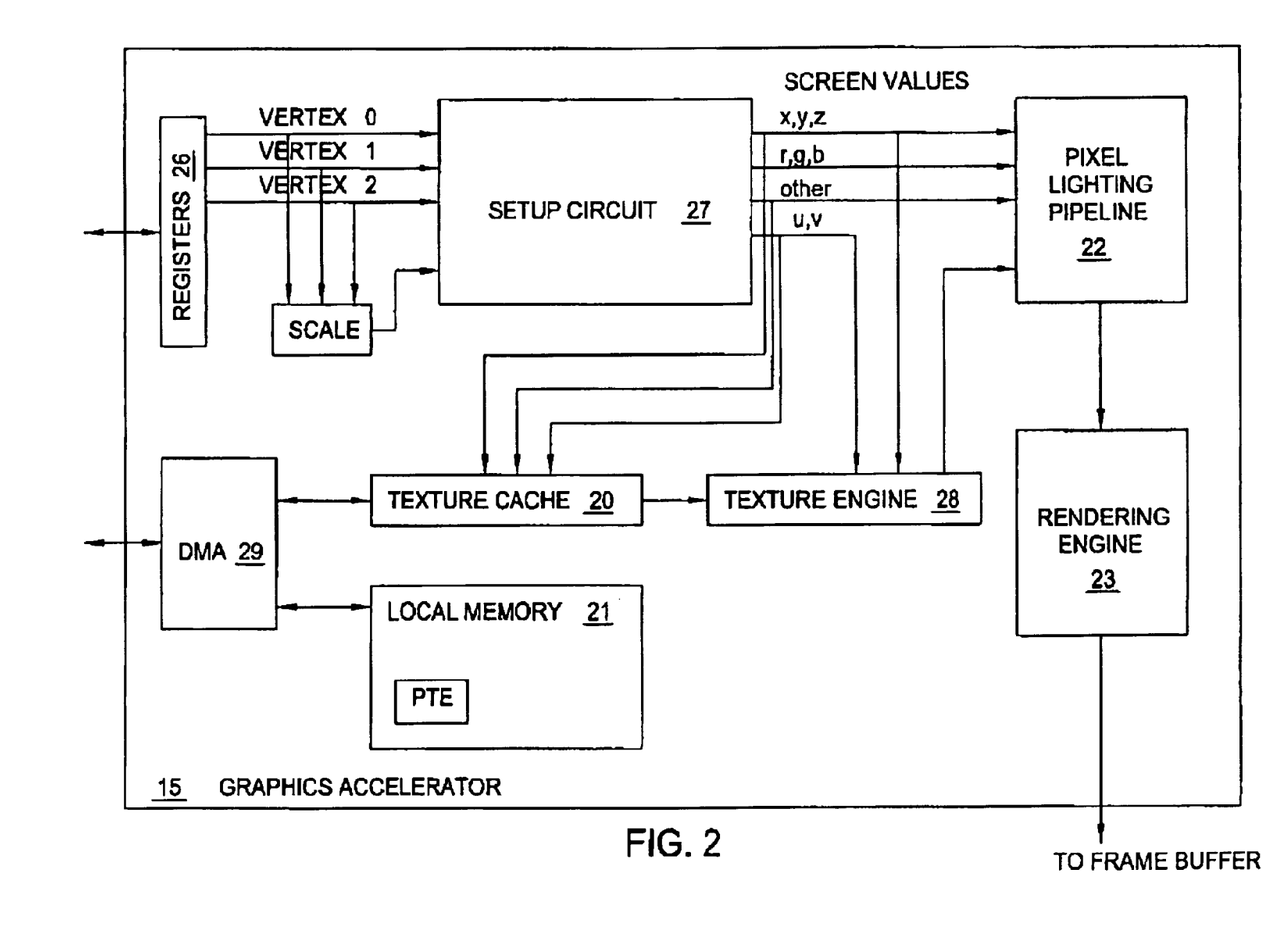
FIG. 2 is a block diagram of a graphics accelerator which is a part of the computer of FIG. 1.

FIG. 2 is a block diagram illustrating in more detail certain elements of the graphics accelerator circuit 15. The graphics accelerator 15 includes a set of registers 26 which receive input values being transferred to the accelerator. As discussed above, from the data describing the vertices of the triangle, the coordinates, color values, depth, and texture coordinates (among other attributes) are derived by the graphics accelerator. This is accomplished by a setup circuit 27 which utilizes the vertex data to derive a number of values which remain constant throughout the triangle being described and uses these constant values to generate screen values of the attributes for each pixel describing the triangle. During the setup process, the setup circuit 27 receives data from the registers 26 describing the three vertices of each triangle which is to be displayed, manipulates that data, and produces outputs for each pixel which are the perspective correct screen values of the distance coordinates, of the color values, of the texture coordinates, and of any other attributes used to describe the pixels being displayed. Although only a single set of texture coordinates is illustrated, it should be understood that a number of different textures may be mapped to any surface to be displayed. The values of most of these attributes are then utilized to vary the color of each pixel describing the polygon.

The setup circuit 27 accomplishes all of the operations necessary to produce the screen coordinates and color values of all of the pixels describing any surface to be presented on the output display. The setup circuit also provides as output the texture coordinates u, v for each texture which is to be applied to each such pixel defining a surface. The portion of the setup circuit 27 which produces these pixel values and texture coordinates is often referred to as a rasterizer.

The texture coordinates generated by the setup circuit 27 define a primary position for a pixel on a texture map. Any pixel may cover a number of particular texels on a texture map. The texture coordinates determined by the setup circuit 27 define a position on the texture map at which the center of a pixel appears on the screen. Texture coordinates are utilized to derive texture values from the texels for each pixel in the triangles in order to map the texture to the triangle.

The accelerator circuit 15 includes a texture engine 28 which utilizes the texture coordinates provided by the setup circuit 27 for each pixel to produce texture values for that pixel. The texture engine 28 also receives texels from a texture cache 20 designed in accordance with the present invention for holding texels transferred from memory. Texels in memory are accessed and provided to the texture cache 20 utilizing a direct memory access engine 29 designed in accordance with one embodiment of the present invention.

Typically, texture mapping is accomplished by a process called bilinear interpolation. By selecting the integral portion of each texture coordinate and adding one to each integral portion, four distinct sets of integral texture coordinates are generated which bracket the position of the original texture coordinates at the center of a pixel. These bracketing texture coordinates may be used to derive texture values from an appropriately scaled texture map. It will be seen that the bilinear interpolation process typically selects the four closest texels to the pixel center position defined by the original texture coordinates. The values of these texels are weighted using the non-integral portions of the original texture coordinates and blended by a texture engine to produce a final texture value for a pixel. More advanced processes evaluate a plurality of positions defined by a plurality of texture coordinates within a pixel to generate a final texture value for the pixel. This final texture value is then one of the attributes used to modify the color values of the pixel before the pixel data is placed in the frame buffer for use in displaying an image.

In order to accomplish this complex process, a very large number of texture values must be available to the graphics accelerator. In accordance with the present invention, a graphic driver responding to an application program may set up data structures (preferably in local memory 21) which describe a large portion of memory (system or local) in which particular texture maps may be stored. The kernel driver obtains page tables from the operating system and uses these to provide page table entries in each data structure giving the physical addresses of texture map data in memory (system or local). The kernel driver then provides a reference to allow the direct memory access (DMA) engine 29 to access the data structures and find the portion of memory in which the texture maps are stored in response to application commands. The kernel driver may store the page tables in local memory 21 so that the DMA engine 29 may accomplish virtual-to-physical address translations locally.

The DMA engine 29 receives commands from an application program indicating the address of a sequence of texels in memory and uses the data structure information to retrieve the addressed texels to fill the cache 20. In one embodiment of the invention, the texels are stored in cache lines which may be accessed in the cache 20 by the u and v coordinates in a pattern which provides locality in both u and v.

Although not a preferred embodiment, it would also be possible for texture data to be furnished to the cache 20 by the CPU 11 under control of the application program.

The texture values generated by the particular process utilized by the texture engine 28 are utilized along with the other attribute values to determine the color values to be placed in a pixel lighting pipeline 22 with the dimensional coordinates and r, g, b color values. The lighting pipeline 22 blends the r, g, b color values and texture values to produce color values for the textured pixel and transfers these pixel color values to a rendering engine 23 which uses the dimensional coordinates and the values stored in a frame buffer 24 to render the pixel data to the frame buffer for display.

In order to describe the improved cache, an embodiment in which four texels are used in a bilinear interpolation process to derive a texture value for a particular pixel will be described. However, the invention may be used with processes utilizing many more than four texels to define a final texture value for a pixel. In the embodiment described, four texture values (texels) must be available at the graphics accelerator 15 during the setup process in order to determine a texture value for the texture for any pixel. Generally, texture values are stored in memory as a part of an array which is an individual texture map. Consequently, it has been typically necessary to transfer at least four texels over the system bus from memory to the graphics accelerator for each pixel processed during the setup routine. With bus access times and other requirements, storage of texture map portions in different pages of memory, and similar problems, the time required for texel transfers is a significant limiting factor in the speed of graphics displays. Alternatively, texture maps are transferred to local memory and accessed there by the graphics accelerator. Although this eliminates the bus time required for access, it requires a significant amount of local memory and still requires accessing the texels in local memory, a time consuming process.

The use of a texture cache overcomes this problem by significantly reducing the amount of texel data required to be transferred from memory. In order to accomplish this, the present invention utilizes the cache 20 of texel data as a part of the graphics accelerating device 15. The cache 20 stores texels which are transferred to the device 15 for use. Since the generation of pixel texture values typically requires the utilization of four adjacent texels in a texture map to produce a single texture value for each pixel rendered on the output display, many of the texels are used a plurality of times in computing adjacent pixels defining a triangle. Consequently, texel values stored in the cache 20 may be used and reused in generating texture values for the pixels in any triangle. Moreover, the texels which are stored in the cache 20 for generating texture value for one triangle are often the same texels used in generating texture values for an adjacent triangle. Consequently, once transferred to and stored in the cache 20, the texels need not be transferred to the cache again unless the cache replacement policy causes them to be overwritten. This significantly reduces data transfer time over the system bus or a local bus from local memory and speeds the graphics rendering process.

In one embodiment, the cache 20 is directly available to the texture engine 28 and may be accessed using the u and v texture coordinates. Theoretically, it would be possible to provide a cache large enough to hold an entire texture map. However, the size of such a cache would make it costly to implement and would greatly increase the time required for transmission of texture values since an entire texture map of values would have to be transferred for each triangle using a new texture map, no matter how small a part of the texture map was to be used by the triangle.

It is more efficient to provide a cache having a size estimated to be sufficient to store, in most cases, texels defining the texture over an entire triangle. By reducing the size of the cache, the number of texels being transferred for each new triangle is much less than the number required to transfer an entire texture map. Moreover, texels transferred to the cache are reused thereby reducing the total amount of data transferred. Consequently, the time of transfer is significantly reduced. Furthermore, the cost of such a cache is much less than that required to hold entire texture maps.

One difficulty in providing a cache to hold texture values is that in contrast to the typical one dimensional processor cache utilized to store data and instructions recently utilized, a cache for texture values must be accessed in two dimensions in order to provide rapid operation. That is, a texel is accessed in a texture map by using the u and v coordinates to determine a position in the map in the same way that x and y coordinates determine a position on the screen. The integer portions of any texture coordinate pair define a position in the plane of the texture map. It is necessary to access four texels surrounding each of whatever number of positions at which values are determined in order to compute the final texture value for a pixel. Consequently, the positional relationship of the texels to one another should be maintained in the cache in order to provide rapid access to the values. The patent application referred to above describes an embodiment of such an arrangement for providing four texels at a time.

In one embodiment, a cache size is selected which is sufficient to hold the data for two of a large percentage of the typical triangles utilized for rendering a shape to a display. A particular texture cache is organized as sixty-four 128 byte lines.

In the embodiments described in the patent application and with any other cache designed to hold texels from which texture values may be generated for mapping a texture to pixels defining a surface, if texel values are not available in the texture cache when the pixel positions and diffuse color values are generated, then a miss occurs. If a miss occurs, the pipeline must be stalled, and the texels accessed in system or local memory. In prior art embodiments, the access delay which occurs from such a stall is between thirty-two and one hundred twenty-eight times that required to access the texel data in the texture cache.

Figure 3:
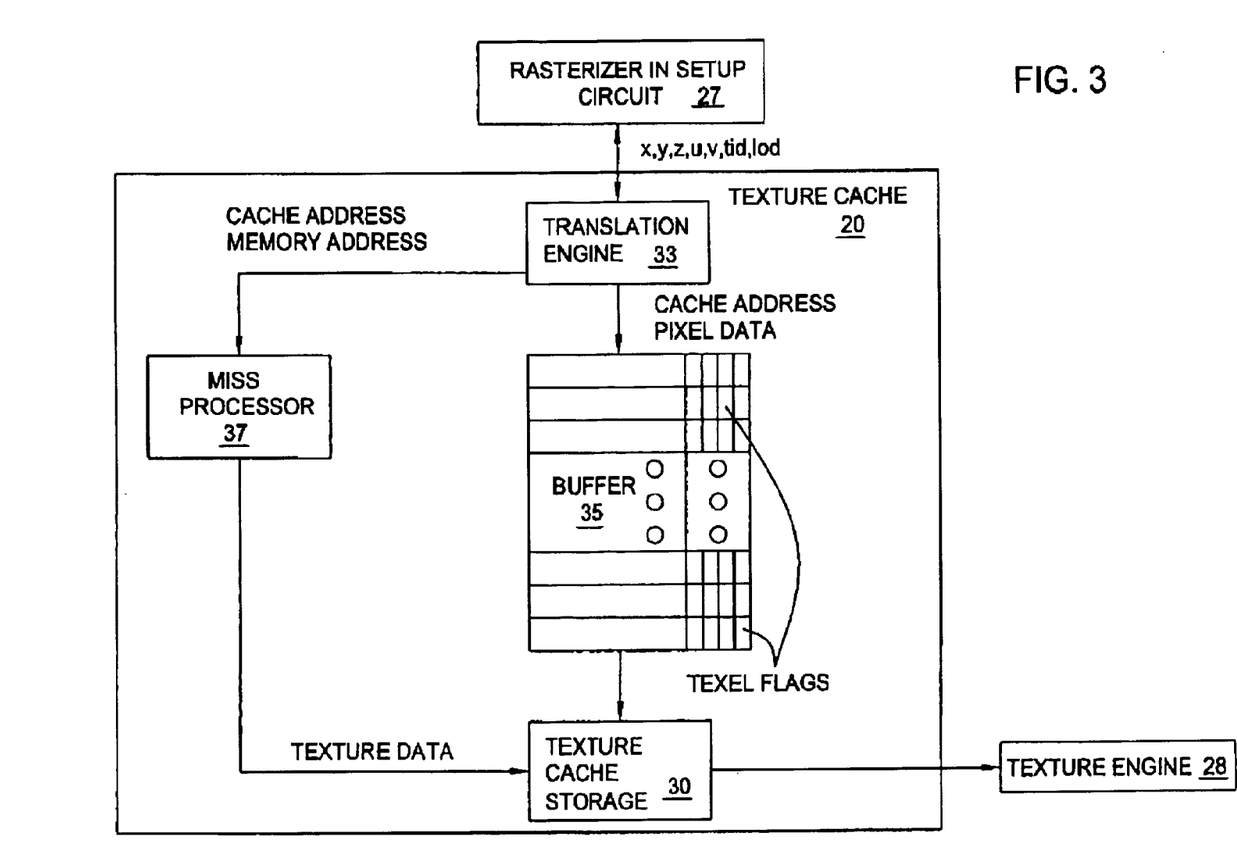
FIG. 3 illustrates in detail a portion of the graphics accelerator shown in FIG. 2.
Figure 4:
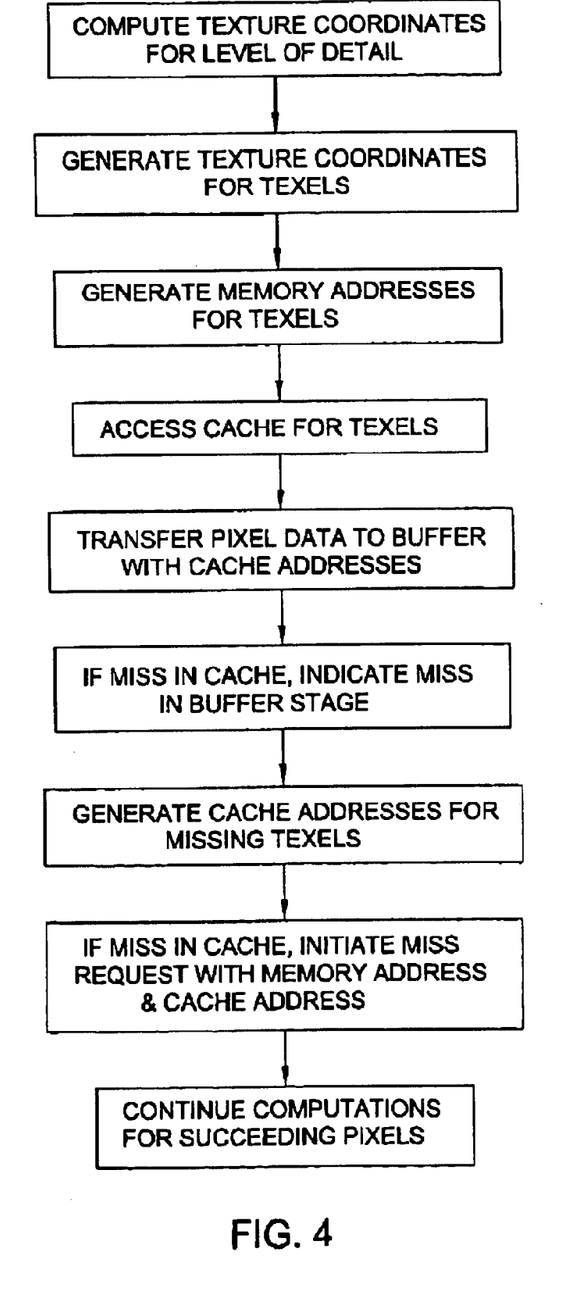
FIG. 4 is a flow chart illustrating the operation of one portion of the graphics accelerator shown in FIG. 3.
Figure 5:
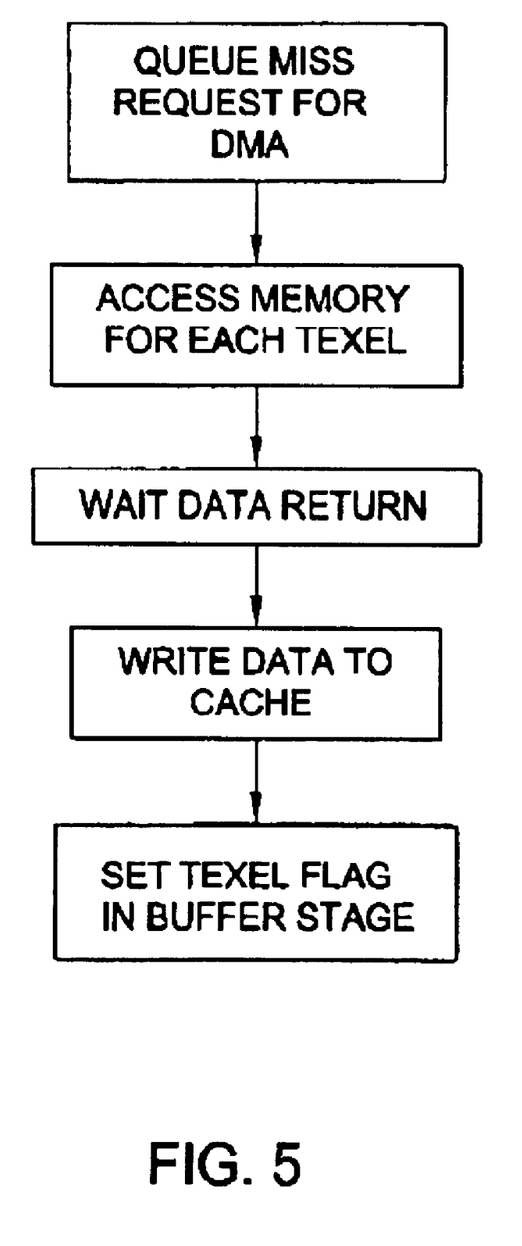
FIG. 5 is a flow chart illustrating the operation of a second portion of the graphics accelerator shown in FIG. 3.

The present invention reduces significantly the cumulative delay caused by stalling the pipeline when texels required for the operation are not in the cache. FIG. 3 illustrates an embodiment of the present invention. FIGS. 4 and 5 describe processes carried out by the arrangement. The embodiment includes texture cache storage 30 and a source of pixel values (typically the output of a rasterizer stage of the setup circuit 27 in a graphics pipeline). Positioned between the source 27 and the cache 30 are a translation engine 33 and a buffer 35.

The operation of the translation engine 33 is described by the flow chart of FIG. 4. The translation engine 33 receives the data from the source 27 and generates memory addresses for the texels required to provide a texture value for each pixel. It should be noted that in certain graphics accelerators which may use the invention, data for a pair of pixels are generated at each clock by rasterizer circuitry; and the translation engine 33 receives data defining two pixels and provides outputs including memory and cache addresses for both pixels. The translation engine 33 uses the memory addresses to access the texture cache storage 30 to determine if the texel data resides in the cache. If all of the necessary texel data for each pixel resides in the texture cache storage, the translation engine 33 places pixel and texel data in an input stage of the buffer 35 along with cache addresses for the texels and sets flags at the buffer stage to indicate all of the texel data is present in the cache.

The buffer 35 is typically a first-in first-out buffer having a number of stages chosen to reduce the need to stall the pipeline in order to access memory for missing texel data. Each stage stores pixel data relevant to the texture blending operation and includes a number of flags which indicate whether the texel data is present in the cache. If two pixels are produced per clock, one embodiment stores data for both pixels in the same buffer stage.

If all of the texel data is not present for any pixel, the translation engine 33 generates cache addresses for the texels which are missing, generates a miss request, and sends the memory and cache addresses of the missing texels to a miss processor 37. The translation engine 33 also places pixel and texel data in the input stage of the buffer 35 along with cache addresses for the texels and sets flags at the buffer stage to indicate the texel data which is present in the cache.

The operation of the miss processor 37 is described by the flow chart of FIG. 5. The miss processor 37 uses the memory addresses provided by the translation engine 33 to access system or local memory for the missing texel data and returns the accessed data to the proper addresses in the cache.

The pixel values generated by the source of pixel values 27 include pixel coordinates (x, y), texture coordinates (u, v), a texture identification, and a level of detail inter alia.

These values are furnished to the translation engine 33. The translation engine provides both memory addresses and cache addresses at which the texels utilized to determine a texture value for a pixel should reside.

In an embodiment utilizing four texels per pixel to determine a texture value, the translation engine 33 provides circuitry which uses the pixel address, the level of detail, and the u v coordinates for a texture to compute four texel addresses and to generate the fractions and weights to be ascribed to each texel. The translation engine converts the u and v texture coordinates to u and v coordinates which are correct for the specific level of detail selected for the texture map through a shift operation. U.S. patent application Ser. No. 09/057,062, entitled Method and Apparatus for Scaling Texture Maps for Graphical Images, Priem et al, filed Apr. 8, 1998, and assigned to the assignee of the present invention discusses processes for determining level of detail. The translation engine provides u and v texture coordinates for the four texels. The integer portions of the u and v coordinates of the four texels are utilized to determine memory addresses of the texels. The manner in which memory addresses are determined depends on the particular organization of memory and is not pertinent to the present invention.

In one embodiment, the texture cache storage itself is organized as four individual RAMs so that four texels may be furnished simultaneously to the texture stage of the accelerator. Data in the texture cache storage is typically replaced one line at a time in accordance with a replacement policy. One such policy is discussed in detail in the above-mentioned patent application. The memory addresses computed by the translation engine are looked up in the cache. If these addresses reside in the cache, the pixel data including the non-integer part of texel addresses are placed in the buffer 35 and the texels are marked as present by setting a flag in the buffer stage for each texel found in the cache. Assuming four texel are to be accessed per pixel, then each of four flags is marked valid. If there is a miss in the cache for any texel, then the translation engine generates a miss request and sends the memory address to the miss processor 37 to access memory for the texels. In addition, the translation stage uses its replacement policy to compute a cache address for the texel data and this is placed in the buffer. The cache address is also sent to the miss processor 37 to indicate the cache position for the memory data which is being accessed.

In one embodiment, the miss processor 37 utilizes a direct memory access circuit (DMA) to obtain the texel data. It should be noted that the texels required for a particular pixel may all reside in positions in memory that are to be placed in different cache lines. This may require that as many as four individual accesses of memory take place to access the texel data. This embodiment of the miss processor queues memory accesses derived from miss requests and issues the individual requests to the DMA circuitry as the DMA circuitry becomes available. The miss processor stores the cache address provided by the translator engine with the miss request. When the data for a miss request is returned, the miss processor 37 causes the data to be written to the appropriate cache address and sets the flag in the appropriate stage of the buffer 35 to indicate the data for the texel is in the cache. As each texel value is returned from memory, it is placed in the cache; and the valid flag bit for that texel is set.

In the embodiment described, a buffer 35 of sixty-four stages is utilized. As the data for each pixel address is placed in the buffer, memory is accessed (if necessary) for that pixel. As new pixel data in the sequence of pixels is generated, it is placed in the buffer 35; and pixel data already in the buffer is moved one stage closer to the cache. If memory access for texels not in the cache requires approximately sixty-four clock intervals, then the pixel data for which the access was initiated should be at the front of the buffer 35 when the texel data arrives from memory and is placed in the cache. Thus, all four texels should be available for use by the texture stage of the graphics pipeline at the same time that the pixel data appears. It should be noted the number of stages of the buffer 35 are selected in a particular embodiment in view of the access time to be expected with the particular circuit embodiment. If most accesses tend to be in local memory, then the buffer may require fewer stages than if most accesses are of system memory.

Those skilled in the art will recognize that by including the buffer and control circuitry for accessing memory to produce texel data essentially as each pixel is ready to be blended with the texture data, the overall speed of graphics pipeline is greatly accelerated over that of prior art texture caches. Rather than continually having to stall the graphics pipeline in order to access memory for cache misses, a single delay typically occurs equivalent to a single access of memory when a particular sea change in the cache occurs.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer, comprising:
   a central processing unit;
   a bus;
   memory; and
   a pipelined graphics accelerator configured to operate in response to a clock having a clock interval, said graphics accelerator including:
   means for generating pixel data including texture coordinates for each texture to be mapped to a surface for display,
   a circuit for generating texture values from texels to map textures to pixels describing a surface,
   a cache storing texels used in generating texture values, and
   a circuit for accessing texels in response to requests for texels for pixels, the circuit including means for buffering requests for texels for pixels for a period sufficient to access texel data not present in the cache, wherein the means for generating pixel data including texture coordinates for each texture to be mapped to a surface for display generates data for a plurality of pixels during each said clock interval.

2. A method for generating texture values for pixels defining a polygon to be displayed by a computer output device comprising the steps of:
   determining pixels defining a polygon,
   generating requests for texels used for providing texture values for each pixel defining the polygon,
   accessing texels to be used in generating texture values for each pixel defining a polygon, including by accessing texels present in a texture cache and texels present in a memory but not present in the texture cache,
   buffering requests for texels for a period equivalent to access of texels from the memory, and generating texture values for each pixel defining a polygon using texels which have been accessed, wherein the step of buffering requests for texels includes the steps of storing an indication of the presence in the texture cache of each texel requested, and changing the indication when texel data is available in the texture cache, and the step of generating requests for texels used for providing texture values for each pixel defining the polygon includes the step of generating requests for texels used for providing texture values for each of a plurality of pixels during a clock interval.

3. A pipelined graphics accelerator configured to operate in response to a clock having a clock interval, said graphics accelerator comprising:

a circuit for generating pixel data including texture coordinates for each texture to be mapped to a surface for display, a circuit for generating texture values from texels to map textures to pixels describing a surface, a texture cache for texels used by the circuit for generating texture values to map textures to pixels, and a circuit for accessing texels in response to requests for texels for pixels, the circuit including means for buffering requests for texels for pixels for a period sufficient to access texel data not present in the cache, in which the circuit for generating pixel data generates data for a plurality of pixels during each said clock interval.

* * * * *

UNITED STATES PATENT AND TRADEMARK OFFICE
CERTIFICATE OF CORRECTION

PATENT NO. : 6,919,895 B1
DATED : July 19, 2005
INVENTOR(S) : Solanki et al.

It is certified that error appears in the above-identified patent and that said Letters Patent is hereby corrected as shown below:

<u>Column 10,</u>
Line 44, replace "textures" with -- texture --.

Signed and Sealed this

Thirteenth Day of June, 2006

JON W. DUDAS
*Director of the United States Patent and Trademark Office*